March 24, 1931.　　　S. F. JACKES ET AL　　　1,798,121
PIPE JOINT
Filed July 3, 1929
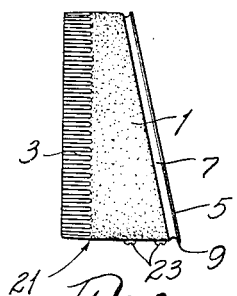
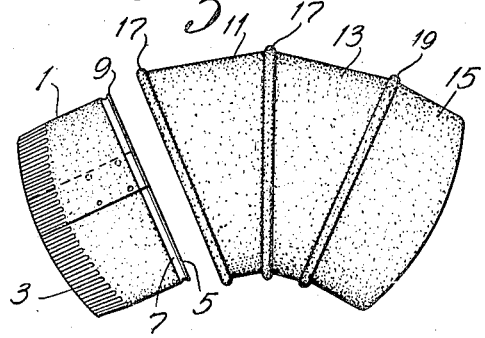
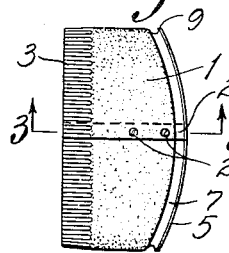
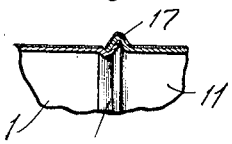
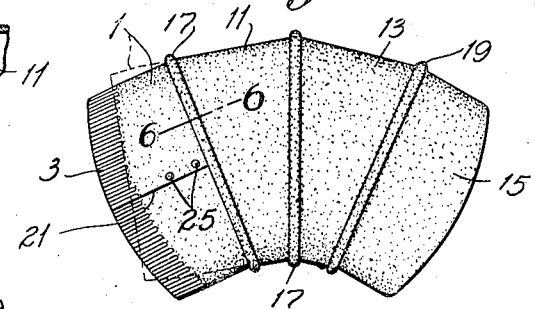
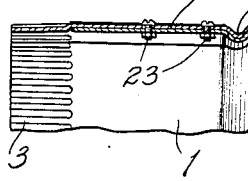
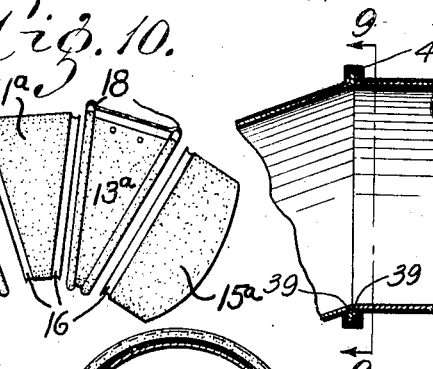
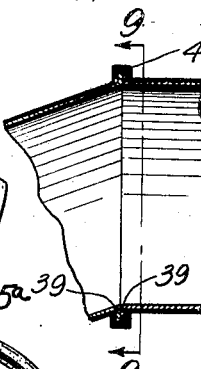
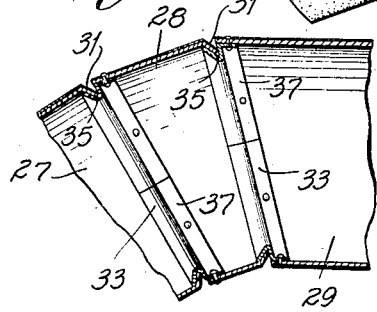
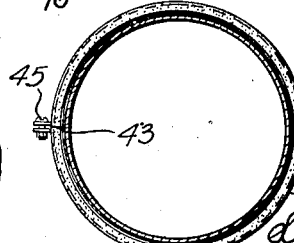

Patented Mar. 24, 1931

1,798,121

UNITED STATES PATENT OFFICE

STANLEY F. JACKES, OF ST. LOUIS, AND LEE H. RUNDER, OF PINELAWN, MISSOURI, ASSIGNORS TO JACKES-EVANS MANUFACTURING COMPANY, OF ST. LOUIS, MISSOURI, A CORPORATION OF MISSOURI

PIPE JOINT

Application filed July 3, 1929. Serial No. 375,632.

This invention relates to pipe joints, and with regard to certain more specific features, to joints for stove pipes.

Among the several objects of the invention may be noted the provision of relatively rotatable joints between sections of adjustable, enameled or similarly decorated elbows; the provision of a device of the class described having a neat appearance, a minimum number of parts and maximum facility of operation and the provision of a device of the class described which may be manufactured at low cost. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a side elevation showing the condition of a pipe section during an enameling operation;

Fig. 2 is a bottom plan view of Fig. 1;

Fig. 3 is a cross section taken on line 3—3 of Fig. 2;

Fig. 4 is a plan view showing the application to other assembled sections of a contracted section;

Fig. 5 shows the contracted section of Fig. 4 in assembled position and expanded, the dotted line showing a relatively rotated position of said section;

Fig. 6 is a cross section taken on line 6—6 of Fig. 5;

Fig. 7 is a cross section showing another form of the invention;

Fig. 8 is a cross section showing another form of the invention;

Fig. 9 is a cross section taken on line 9—9 of Fig. 8; and,

Fig. 10 is a side elevation showing a modified form of the invention in position about to be assembled.

Similar reference characters indicate corresponding parts throughout the several views of the drawings.

Referring now more particularly to Fig. 1, there is illustrated at numeral 1 a rolled section of pipe, having a crimped and tapered edge 3 for the purpose of making connection with other straight or like pipe sections. The other edge 5 of this section 1 is formed at an angle and comprises an inwardly formed female bead 7 at the edge of which is an outwardly turned lip 9. It is to be understood that this section, as well as the other sections of pipe herein described, are composed of the light weight, black, sheet iron which is adapted to be rolled, spun or otherwise shaped into the forms shown.

Fig. 4 shows other sections such as 11, 13 and 15, also having angularly formed edges. The assemblies shown in Figs. 4 and 5 are known as pipe joints and it will be readily appreciated that if the assembly of joints is effected so that there may be relative rotation at the joined angular edges, that the four (or other predetermined number of) sections of any joint may be so relatively turned that various angles may be formed between the first joint 1 and the last joint 15, or offsets in the pipes being joined may be accommodated. Also, the joint may be converted from one which is adapted to join pipes located in the same plane to one which will join pipes located in different planes. Furthermore, the joints may be manipulated to give a straight connection. All of the above points are exemplified by the dotted line position of section 1 shown in Fig. 5.

It is to be understood that, in Fig. 5, the dotted line position of the section 1 is obtained by rotating said section 1 on section 11. It is to be further understood that relative rotation may be effected between any or all sections so that any one of an infinite number of adjustments may be made.

Heretofore, joining of the sections has been accomplished by first rolling the metal comprising the sections into cylinders having the proper angularity of edges. The edges which were to be joined were then provided with enough male and female beading to permit them to be sprung together and then the beads were completed by a tool operating from within and/or without the pipe. Inasmuch as no further treatment of the pipe was necessary, this was satisfactory. However, when it is desired to use enameled pipe or the like, the above described method is impracticable. The reason is that if the sections are enameled before they are sprung together, then the action of the beading tool chips off the hard and brittle enamel, if the operation of the tool is not interfered with altogether. On the other hand, if the sections of the elbow are assembled in the manner above described before the enamel is applied, then the subsequently applied enamel interferes with the proper operation of the connections between the joints. That is to say, the enamel runs into the beaded portions and seals them so that the various joints can not be turned, one with respect to the other. The purpose of this invention is to provide a means for making an adjustably jointed elbow of enameled or similarly decorated pipe which will be perfectly operable and economically made.

In order to accomplish the above improvements, we provide the section 11 as a master section, that is, it is made up by rolling the metal into a cylindrical section having two external, male, end beads 17 permanently attached thereto and rolled to full contour when this section 11 is manufactured originally. This section is not split, but is riveted or welded or otherwise fastened along a seam so that it comprises a permanent cylindrical contour. The end section 15 is of the same type, except that it has only one outwardly rolled bead 19. The other edge of this end section 15 is formed without taper or bead so that it can receive the tapered end of a straight or like section of pipe. Sections 11 and 15 are permanently formed as non-expansible or contractable cylinders.

Referring again to Figs. 1 to 4, it will be seen that the section 1 is provided with an openable lap joint 21, said joint having aligned openings therethrough for receiving temporary screws or bolts 23. When the screws 23 are in position to hold the lap joint shut, then the section 1 is of proper diameter for final positioning in the Fig. 5 assembly. After the section 1 has been rolled and provided with the full internal beading 7, it is held in expanded position by means of temporary screws 23. Under these conditions, it is enameled as shown in Figs. 1 and 2, and after the enamel has been applied but before baking, the enameler wipes the enamel from the bead 7. After this, the section is baked so that the enamel is hardened. Thus, no enamel is deposited in the groove of the internal bead 7. In order that the screws 23 may be readily removed, they are composed of brass which repels enamel. At this time, sections such as 11, 13 and 15 are also enameled. Section 13, being of the same nature as the section 1, under consideration, is also provided with an openable lap joint, that is, it is split and the same precautions are taken to keep the enamel out of its internal beads.

The enameling on sections 11 and 15 is accomplished so that the enameling takes place over the external beads 17 and 19 (see for example Fig. 6) but not internally of said beads.

The next operation, after the enameling, is to remove the brass screws 23 and collapse the section 1 enough that the flange 9 becomes positioned within the outwardly rolled bead 17 of the section 11. The collapsed position of the section 1 is shown clearly in Fig. 4. After being internally positioned as described, the section 1 is re-expanded to the position shown in Fig. 5 and rivets 25 placed through the holes through which the screws 23 were previously positioned. These rivets are then set in the usual manner. Hence, the section 1 is rotatably positioned within the section 11, its internal bead 7 functioning rotatably within the external bead 17. Said section 1 has a variable contour during most of the manufacturing operations. It is to be understood that the section 13 is not unlike the section 1, except that it has two inward beads (not shown) such as 7 shown in Fig. 1, one located at each end, one of which cooperates with an external bead 17 of the section 11, and the other of which cooperates with the external bead 19 of section 15.

It is to be understood that as many or as few sections may be used as desired, the invention consisting in providing an expansible and contractable portion for effecting a rotatable connection so that the pipe forming the section may be put into the curvature it will assume when in final position, the enamel being deposited upon such a curvature.

The normal position of the pipe is expanded, the hard enamel aiding to hold it so. Also, the joint as a whole is not assembled when enameled and the enamel may thus be taken out of the portion which is to later permit relative movement. The preferred form of the invention is that shown in Figs. 1 to 6, because in that form there are no extraneous expansible members, the sections themselves being the expansible members.

However, there are other forms of the invention which may sometimes be found useful, such as shown in Figs. 7 to 9. One of these forms is shown in Fig. 7 wherein the pipe sections for the joint such as 27, 28 and 29 are formed without the external beading. They form permanent cylinders which are enameled as permanent cylinders. Each section is, however, provided with an inwardly bent flange 31 which abuts the other end of a contiguous section where there is no flange. An internal expanding ring 33 having a groove 35, is expanded internally so that the groove 35 receives the internal flange 31 in rotatable engagement. At the same time, a collar 37 on said ring 33, is made to engage with the interior of contiguous section to which the member 33 is riveted after expansion. This construction is used at each joint between sections. Thus there is provided a separately expansible piece which has never been enameled and free motion is therefore assured. It is to be understood that the angular edges effect ellipses to which the ring 35 must fit, the term "ring" herein being applied to elliptical closed shapes as well as circular ones.

In Figs. 8 and 9 is shown another form of the invention wherein each edge of each contiguous section is provided with an outwardly turned flange 39, such flanges abutting one another. The sections are again formed as permanent cylinders and they are enameled at all points except upon and near the flanges 39. A U-shaped contractable, enameled ring 41 is then brought over the flanges and contracted. It is provided with an abutment 43 which permits free relative rotation between the flanges 39 when the clamp 41 is in position. A screw 45 maintains the relative positioning described. Thus the effect of the other two forms is had.

It is to be understood in the above discussion that the enameling material is applied to the pipe in a moist condition and as such, may be readily wiped from regions such as 7 in Fig. 3, 35 in Fig. 7 and/or 39 in Fig. 8. This wiping may be effected readily when the parts are separated, but when they are not separated, as in the case of the manufacture of pipe under the old method, then this wiping procedure can not be effected. With this invention, the enamel is baked at the proper places so as to leave the joints free, but under the old method, the enamel was baked into the joint itself inasmuch as it was impossible to remove it. This baking in of the enamel was fatal to proper subsequent operation of the joints.

In Fig. 10 is shown another form of the invention, not unlike the Fig. 4 form in which similar master sections 11ª and 15ª are used; except that in the Fig. 10 form these master sections are provided with female beads 16 as shown. The resilient sections 1ª and 13ª have the external male beads 18. Also, instead of the resilient sections being contracted to be positioned in juxtaposition with the master sections, they are expanded. This is an easier operation under certain circumstances and is sometimes to be preferred. The resilient sections are finally riveted shut after application over the master sections, subsequent relative rotation being possible.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. In a pipe construction having telescopically engageable pipes comprising relatively thin sheet metal bases, each base having a coat of enamel whereby relatively stiff body portions are formed, means for facilitating turning of said pipes after assembly thereof without breaking enamel from the enameled portions, comprising a relatively narrow longitudinal zone on at least one pipe free of enamel at the region of engagement whereby said zone retains its initial flexibility, said flexible engaging portion conforming to any non-circularity in form of the contiguous engaging portion of the other pipe.

2. In a pipe construction having telescopically engaging, angularly related sections, the interfitting portions of said sections being of non-circular cross section, said sections comprising relatively thin sheet metal bases, each base having a coat of enamel whereby relatively stiff body portions are formed, means for facilitating turning of said pipes after assembly thereof, without breaking enamel from the enameled portions, though said interfitting portions be non-circular, comprising a bead free of enamel on the internally positioned pipe, whereby said bead retains its initial flexibility in its final position, and a cooperating externally enameled bead on the externally positioned pipe.

In testimony whereof, we have signed our names to this specification this 28th day of June, 1929.

STANLEY F. JACKES.
LEE H. RUNDER.